United States Patent [19]

Hartmann et al.

[11] Patent Number: 5,332,300
[45] Date of Patent: Jul. 26, 1994

[54] PROCESS FOR CONTROLLING THE STABILITY OF VEHICLES

[75] Inventors: Uwe Hartmann, Stuttgart; Anton van Zanten, Ditzingen, both of Fed. Rep. of Germany

[73] Assignee: Robert Bosch GmbH, Stuttgart, Fed. Rep. of Germany

[21] Appl. No.: 392,957
[22] PCT Filed: Sep. 15, 1988
[86] PCT No.: PCT/EP88/00842
§ 371 Date: Dec. 11, 1992
§ 102(e) Date: Dec. 11, 1992
[87] PCT Pub. No.: WO89/02842
PCT Pub. Date: Apr. 6, 1989

[30] Foreign Application Priority Data
Sep. 22, 1987 [DE] Fed. Rep. of Germany ....... 3731756

[51] Int. Cl.⁵ ............................................. B60T 8/32
[52] U.S. Cl. .................................... 303/100; 303/110; 364/426.02; 180/197
[58] Field of Search .................... 180/197; 303/95–97, 303/100, 103, 106, 110, 111; 364/426.02, 426.03

[56] References Cited

U.S. PATENT DOCUMENTS

| | | | |
|---|---|---|---|
| 3,910,647 | 10/1975 | Takeuchi | 180/197 X |
| 4,794,538 | 12/1988 | Cao et al. | 364/426.03 X |
| 4,862,368 | 8/1989 | Kost et al. | 364/426.02 |
| 4,902,076 | 2/1990 | Ushijima et al. | 303/103 X |
| 4,998,593 | 3/1991 | Karnopp et al. | 303/96 X |
| 5,066,074 | 11/1991 | Wupper | 303/97 |

Primary Examiner—Robert J. Oberleitner
Assistant Examiner—Alfred Muratori
Attorney, Agent, or Firm—Felfe & Lynch

[57] ABSTRACT

A lower limiting value of the yaw speed is calculated as a function of the steering angle, the vehicle speed, and the coefficient of friction between tires and road. If the yaw speed falls below the lower limiting value, the brake pressure is reduced in order to increase lateral stability.

22 Claims, 5 Drawing Sheets

PROCESS FOR CONTROLLING THE STABILITY OF VEHICLES

SUMMARY OF THE INVENTION

The invention relates to a process for controlling the stability of a vehicle, particularly during the negotiation of curves.

It is the object of the invention to stabilize a vehicle in all possible road and driving conditions while the vehicle is braking and to have the vehicle under control by the driver. Stabilizing is required, for example, when friction coefficients are different for the left and right wheels of the vehicle or if the vehicle is susceptible to oversteering during braking in curves. The vehicle is considered to be controllable if it reacts to steering in the manner desired by the driver.

This object, as well as other objects which will become apparent from the discussion that follows, are achieved, according to the present invention, by a process comprising the steps of:
- (a) determining the steering angle $\delta$, the vehicle yaw speed $\Phi$, the vehicle forward speed $v_F$ and the coefficient of friction $\mu$ between the tires and road;
- (b) calculating either a lower limiting value curve or a desired value curve of the yaw speed $\Phi$ as a function of the steering angle $\delta$ and in dependence upon the vehicle speed $v_F$ and the coefficient of friction $\mu$; and
- (c) reducing the brake pressure by the measured yaw speed if the yaw speed falls below the limiting value curve or adjusting the brake pressure to vary the yaw speed in the direction of the desired value curve.

To optimize the brake system, the stability control can override another control or be integrated into the latter. The stability control requires sensors for the yaw movement and the steering angle of the vehicle and also information on the friction coefficient of the road and the vehicle speed. The coefficient of the friction, for example, can be computed from the highest possible vehicle deceleration. Vehicle deceleration and vehicle speed are generally known from the brake pressure regulator of the anti-lock braking system or they can be measured directly.

A desired value or a valid range for the yaw speed can be calculated from the steering angle, the speed of the vehicle and the coefficient of friction.

Possibilities of employing the yaw speed control to influence the brake force depend upon the number of brake channels; i.e., the number of groups of wheels to which the brake pressure can be independently applied.

A one-channel system permits only a common change of all wheel brake pressures. A pressure increase or reduction caused by the yaw speed control therefore always affects all wheels at once. A pressure increase must not cause both rear wheels to lock.

In a two-channel system, for example, each diagonal can be independently controlled. The manner in which the channels are influenced is dependent upon the sign of the yaw speed, the steering angle and other boundary conditions.

Three or four-channel systems permit the influence of brake pressure at each individual wheel.

For a full understanding of the present invention, reference should now be made to the following detailed description of the preferred embodiments of the invention and to the accompanying drawing.

DETAILED DESCRIPTION OF THE PREFERRED EMBODIMENTS

Figure 1:
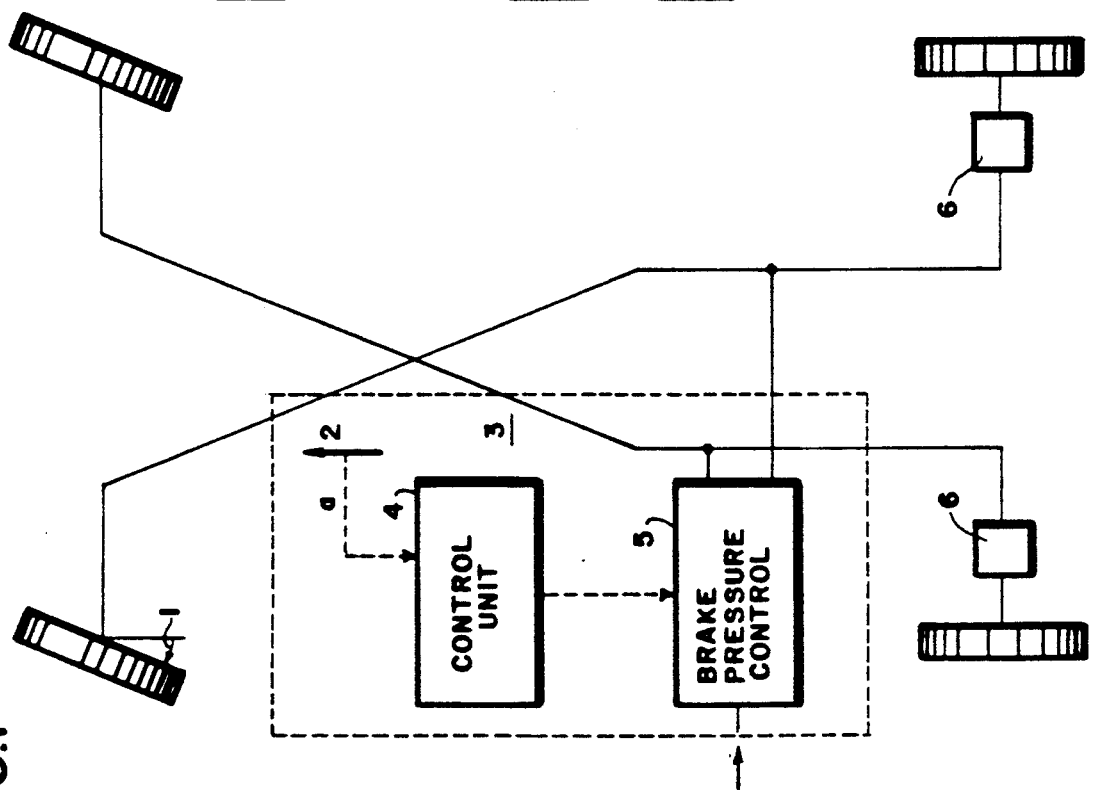
FIG. 1 shows a brake pressure control system where the invention is used as an overriding control.

FIG. 1 illustrates a one-channel configuration of an anti-lock braking system having a sensor 2 for the vehicle acceleration in the longitudinal direction of the vehicle, as indicated by the arrow. Actuating signals for a pressure regulator 5 are produced by a microprocessor-based control unit 4. The pressure regulator, for example a controllable brake force booster, can synchronously change the pressure in both brake circuits. As standard equipment of the vehicle, devices such as one or two load-controlled brake pressure reducers 6 are provided to adjust the brake pressure ratio between front and rear axles. With such a configuration, it is possible to advantageously combine the entire control system 3 into one unit which can replace the present brake force booster without requiring further modification of the braking system of the vehicle. After a pressure increase pulse of constant or variable length, this control calls for a delay until the derivative of the filtered vehicle acceleration (da/dt) assumes a minimal (negative) value. A limit value is computed from the height of the sudden pressure increase, which must not be exceeded by da/dt, in order to permit a further pressure increase pulse and consequent pressure increase.

This change between increasing and maintaining the pressure is repeated until the vehicle deceleration increases only to a very small extent after the pressure increase pulse. One can then assume that several wheels are moving within the limit range of the slip curve or have already exceeded this range.

Selecting the limit permits one to determine to a certain extent whether the locking of one or several wheels is acceptable. If da/dt does not fall below the lower limit after a pressure increase pulse, the control, in order to increase the lateral guiding force, reduces the pressure so as to finally ensure that the wheels are moving in the stable range on the left of the maximum value of the slip curve. This is detected by a sudden strong decrease of the vehicle deceleration; i.e., da/dt exceeds a prescribed upper limit. The pressure can then be increased again and the entire procedure repeated.

Figure 2:
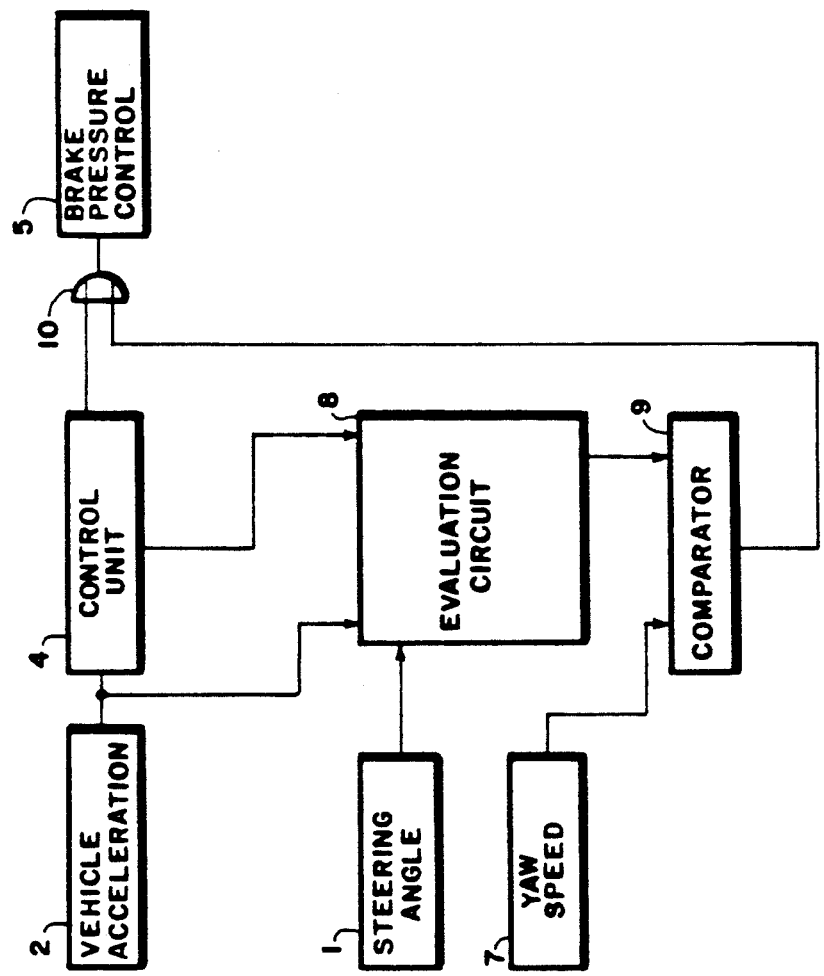
FIG. 2 is a block diagram of an exemplary control system.

FIG. 2 illustrates the control electronics of FIG. 1. In addition, however, the overriding control unit is represented which consists of a steering angle sensor 1, a yaw speed sensor 7, an evaluation circuit 8 and a comparator 9.

In addition to the signals of the measured-value sensors 1 and 7, the vehicle deceleration signal of the measured-value sensor 2 and a value indicating the vehicle speed are supplied to the evaluation circuit 8. The present friction value is computed in the evaluation circuit 8 based on the maximum vehicle deceleration.

Figure 3:
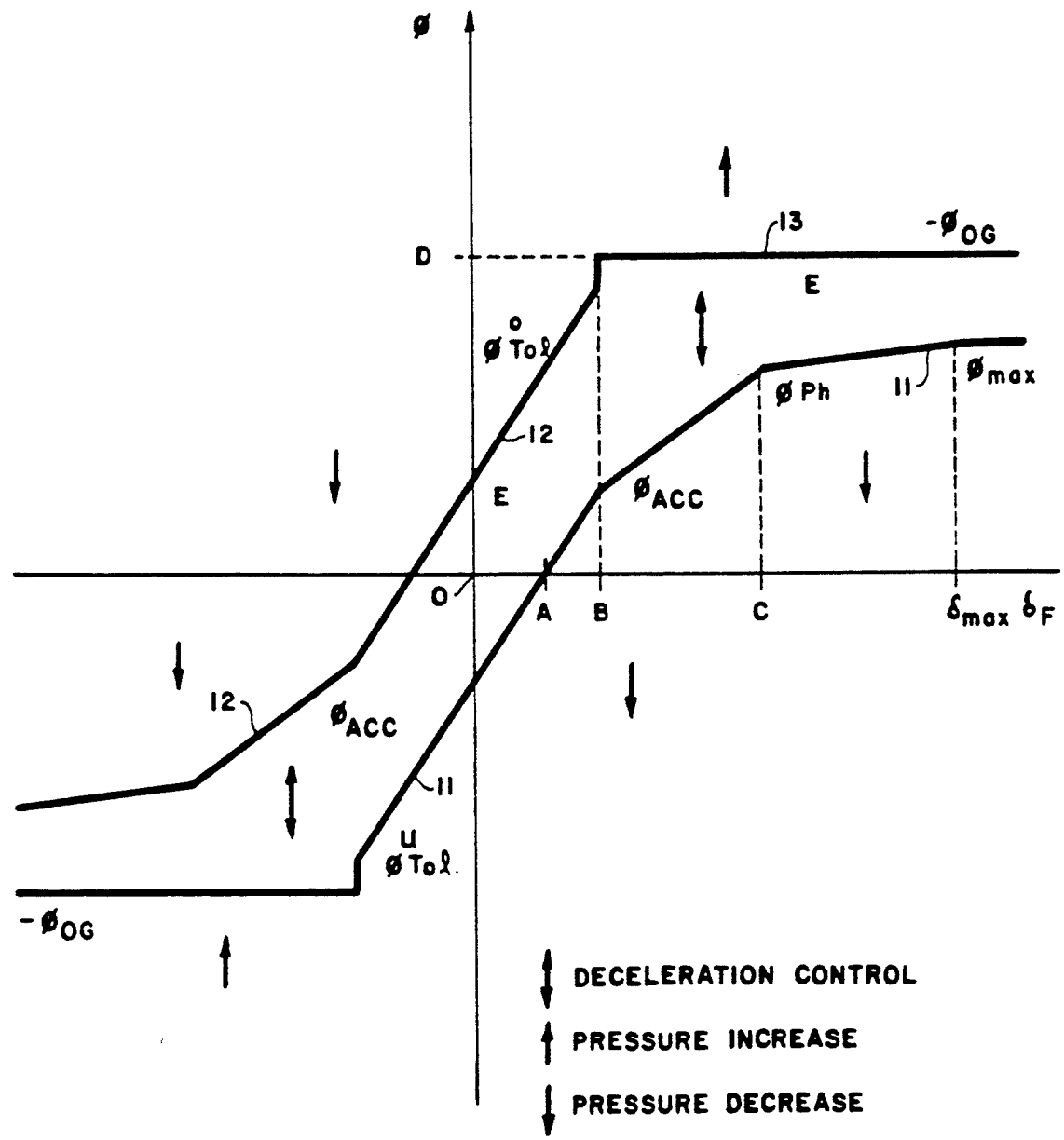
FIG. 3 and 5 are explanatory diagrams.

Evaluation circuit 8 computes curves 11 and 12 (FIG. 3) from the measured values. They represent the limiting value curves for the yaw speed $\Phi$ as a function of the steering angle $\delta$, whereby the steering angle and the resulting yaw speed are designated as being either positive or negative depending upon the respective direction of steering wheel lock.

For a steering locking to the right, curve 11 represents the lower limiting value curve. If a yaw speed $\Phi$ does not reach the limiting value curve at a given steering angle, taking into consideration the present coefficient of friction $\mu$ and the present vehicle speed $v_F$, the brake pressure is reduced in order to obtain a higher yaw speed. This leads to an increase of both the lateral guiding and the yaw speed. The comparison between the measured yaw speed and the computed limiting value, which is required for this purpose, is performed in the comparator 9 which, in turn, supplies a decrease signal via an or-gate to the brake pressure control unit 5. The threshold 13 is available as the maximum comparative value. If it is exceeded by the yaw speed, the brake pressure is increased to avoid an oversteering condition. In the region E between curves 11 and 13, the brake pressure is determined exclusively by brake pressure control devices 2, 4, and 5.

The curve 11 is composed of several ranges. Between O and A,—that is, in the range of the smaller steering angles—there is a given range of tolerance. Any operation outside of this range causes a pressure decrease to avoid instability.

For smaller steering angles (dead zone), this tolerance range can be given by the following equation:

$$\Phi_{Tol} = b_{Tol} + K_{Tol} \times \delta$$

where $b_{Tol}$ and $K_{Tol}$ are vehicle speed dependent coefficients.

With dynamic correction to allow for vehicle inertia and steering elasticity, the result is:

$$\Phi_{Tol}^{uo} = \pm b_{Tol} + K_{Tol} \times \delta_F$$

where $\delta_F$ can be obtained through low-pass filtering

Figure 4:
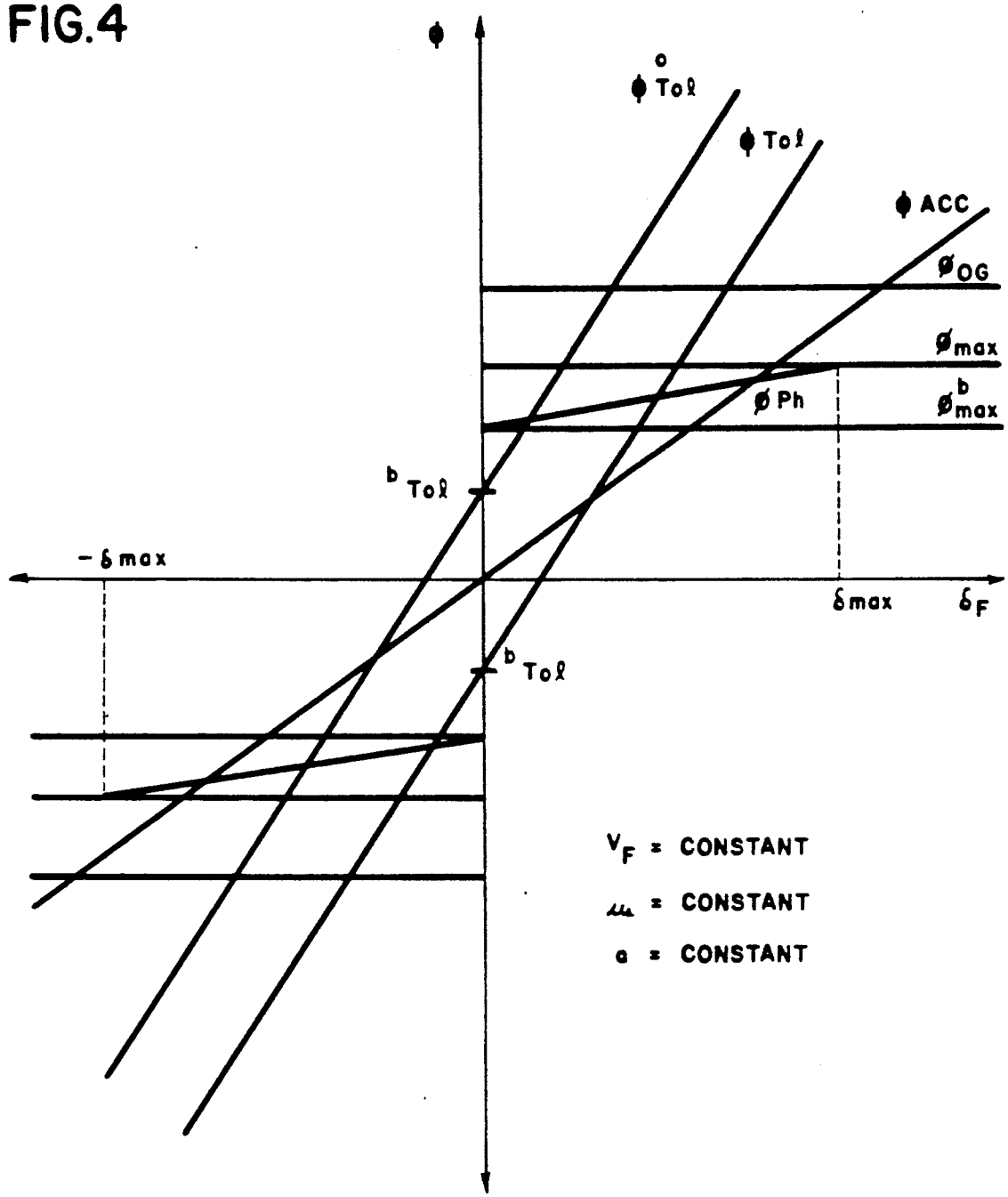

Both straight lines are included in FIG. 4 and designated as $\Phi_{Tol}^o$ and $\Phi_{Tol}^u$. The instability in this range could, for example, be caused by different friction values on opposite sides of the vehicle.

The tolerance range (O to A) is followed by a range A to B in which it is determined whether there is a yaw speed corresponding to the direction of the steering wheel lock. If this is not the case, the brake pressure is reduced, thus ensuring that the vehicle is under control.

In the range B to C, the curve characteristics are determined by the so-called "Ackermann-condition."

For cornering without side slip of the tires, one can apply the function $$\Phi_A = \frac{v_F \delta}{L},$$

where L stands for the wheel base.

With a dynamic correction allowing for vehicle inertia and steering elasticity, the following dynamically corrected Ackermann condition results:

$$\Phi_{AC} = \frac{v_F \delta_F}{L}$$

$\delta_F$ can be obtained through low-pass filtering from $\delta$. Since this value cannot be achieved in practice for wheels due to side slip of the tires increasing with the steering angle and the vehicle speed (for vehicles with an understeering tendency particularly at the front wheels), a further, vehicle-controlled correction is made:

$$\Phi_{ACC} = a_{AC} \times \Phi_{AC}$$

with $$a_{AC} = f_{AC}(v_F, \delta)$$

For example with:

$$f_{AC} = \frac{1}{1 + K_{vF} \times v_F^2}$$

It is thus understood that the curve range B to C is not only a function of $\delta$, but also of $v_F$.

This curve is also represented in FIG. 4.

From steering angle C onward, the limiting value curve can be determined from the following criteria:

In case there is no braking, the following applies to the transverse acceleration $a_Q$ necessary to overcome static friction:

$$a_Q = \mu_o \times g$$

where $\mu_o$ is the coefficient of friction and g is the acceleration due to gravity.

For stationary cornering, the centrifugal acceleration is $$a_Z = R\Phi^2$$
$$= R\Phi \frac{v_F}{R} = \Phi \times v_F,$$

where R is the curve radius.
It must be true that:

$$a_Q = a_Z.$$

this means the maximum yaw speed is $$\Phi_{max} = \frac{\mu_o \times g}{v_F}$$

The average road friction coefficient is computed from the maximum longitudinal deceleration—a which was last reached during braking:

$$\mu_o = K\mu_o \times (-a)_{max},$$

where $K\mu_o$ is a constant.

The longitudinal deceleration is either measured directly or taken from a differentiation of the vehicle speed or a possible present reference speed.

Allowing for the decreasing lateral guiding force with increasing longitudinal deceleration and consequently an increasing wheel slip, the result is:

$$\Phi_{max}^b = \frac{1}{1 + K_b \times (-a)} \times \Phi_{max}.$$

where $K_b$ depends on the tire parameters (brake slip stiffness, side slip stiffness).

In order to also achieve a certain dependency from the steering angle, the limiting value curve in the range C to $\delta_{max}$ is determined as follows:

$$\Phi_{Ph} = \pm K_{Ph} \times \left( \Phi_{max}^b + \frac{\delta_F}{\delta_{max}} (\Phi_{max} - \Phi_{max}^b) \right).$$

$K_{Ph}$ is a constant to allow for computing errors, inaccuracies etc.

The constant $\delta_{max}$ is a steering angle which is usually not exceeded during vehicle speeds at which a control can be necessary.

This means that when the steering angle increases, i.e. when the driver wants the yaw speed to increase, the pressure is decreased in an extreme case so as to obtain the yaw speed which is reached if there is no braking.

If the steering angle $\delta_F$ is greater than $\delta_{max}$, the limiting value assumes independently from the steering angle the value $$\Phi_{Ph} = \pm K_{Ph} \times \Phi_{max}$$

The straight lines, $\Phi_{max}$, $\Phi_{max}^b$, and $\Phi_{Ph}$ are also included in FIG. 4 (for $K_{Ph} = 1$).

If the yaw speed exceeds value D, the vehicle is in danger of oversteering and becoming instable. A brake pressure decrease would cause the yaw speed to further increase and amplify the instability. Therefore, in this case it is preferable to increase the brake pressure at the front wheels and consequently also the slip so as to decrease the lateral guiding force and the yaw speed.

The upper limit for the yaw speed in order to avoid oversteering is:

$$\Phi_{OG} = \pm K_{OG} \times \Phi_{max}$$

where $K_{OG} < 1$

The characteristics of these straight lines are also included in FIG. 4. Segments of the straight lines included in FIG. 4 give the curves 11, 12, and 13 of FIG. 3 which apply for a constant vehicle speed $v_F$, a constant a, and consequently a constant $\mu_o$. For a steering wheel locking to the left the above explanation correspondingly applies. Arrows are included in FIG. 3 to indicate when the pressure is decreased or increased. The double arrow in range E indicates that only the subordinate control fulfills a control function.

The brake pressure decrease achieved by the limiting value curve decreases the slip at the corresponding wheels and increases the lateral guiding force. The vehicle then exhibits a stronger response to steering wheel locking and the yaw speed increases.

In the median range E between the limits, the subordinate control algorithm need not be utilized. The brake force can be optimized as usual.

The vehicle speed required can, for example, be approximated by means of the average front wheel speed at the differential (speedometer speed) and the vehicle deceleration which is measured.

As an alternative to the range monitoring described for the yaw speed, it is possible to provide a direct control based on a desired value for the yaw speed. This value can also be built up segment by segment based on the above mentioned criteria. For this purpose a stronger coupling of both control units (multiple value control) is preferable to a forced modification of the longitudinal deceleration control.

Improved controller action can be achieved by including the differentiated yaw speed (yaw acceleration). This may be realized with a proportional-differential (PD) yaw speed control or a PD control with a dead zone.

Figure 6:
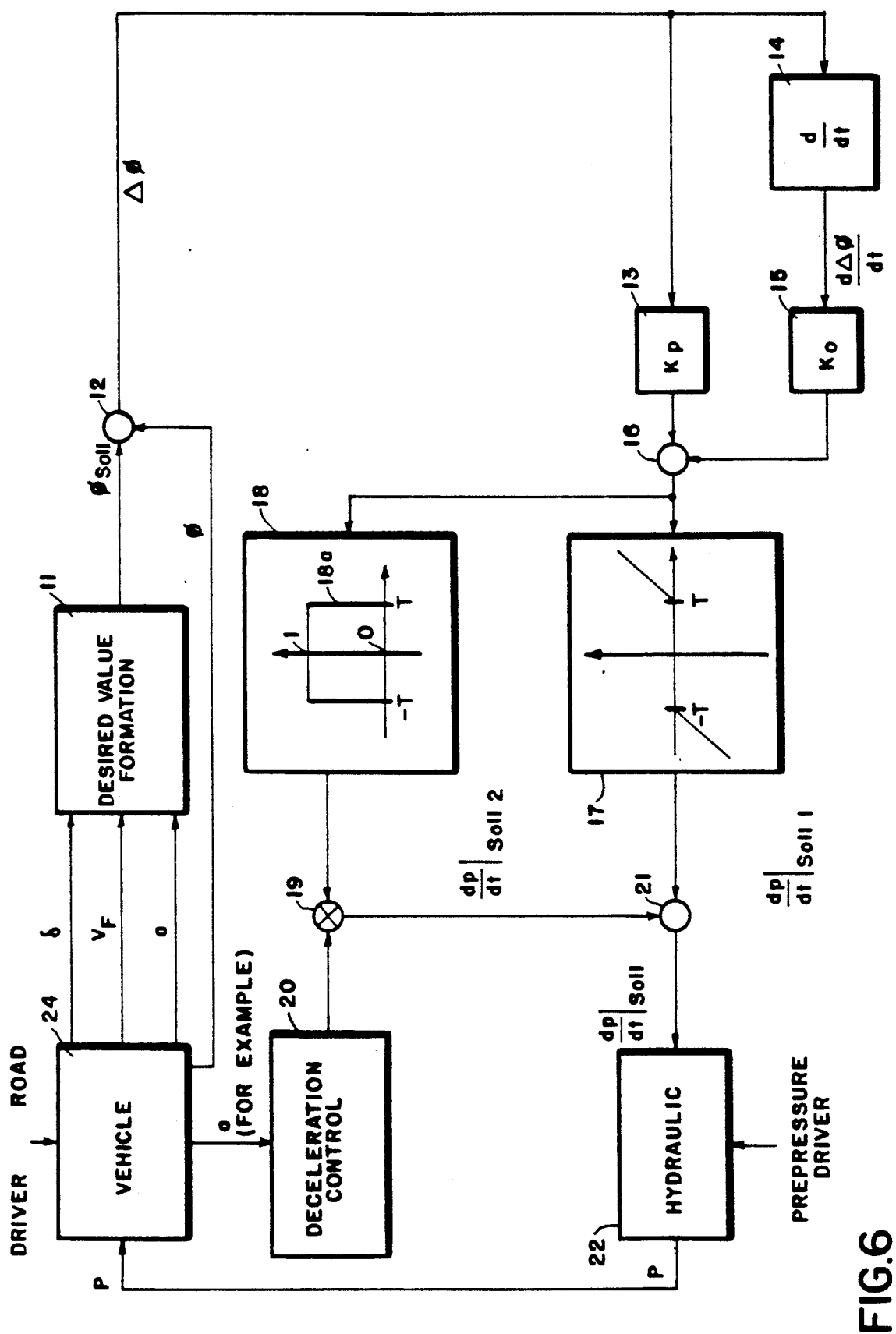
FIG. 6 is a block diagram of another control system.

The following is an example of such a PD control with a dead zone for a one-channel system of the type described above in connection with FIG. 1. FIG. 6 shows a block diagram of the entire system. In a vehicle 24 the steering angle $\delta$, the vehicle acceleration a, and the vehicle speed $v_F$ are measured and supplied to a desired value generator 11. $v_F$ can also be computed from the speedometer speed and the vehicle acceleration.

Figure 5:
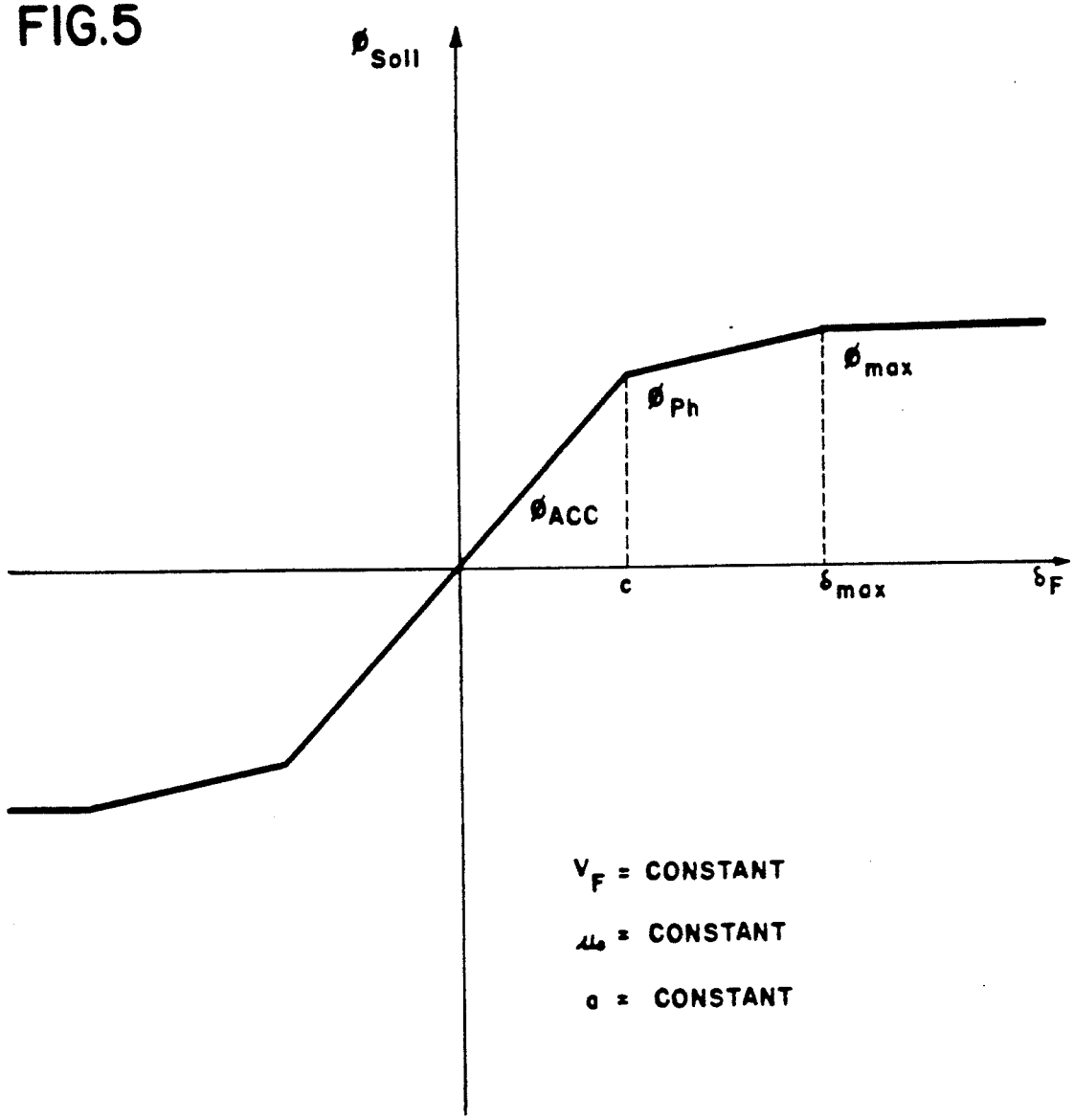

The desired value generator 11 determines a desired value for the yaw speed ($\Phi_{Soll}$), as represented, for example, in FIG. 5. The desired value curve is composed segment by segment from the straight lines as already described in FIG. 4. The straight lines $\Phi_{To1}$ and $\Phi_{To1}$ are not required for this purpose A such determined desired value $\Phi_{Soll}$ is compared in comparator 12 to the measured yaw speed $\Phi$; the result is a control deviation $\Delta\Phi$. This value is supplied to an amplifier 13 and the result is the P portion for the control. The control deviation differentiated in differentiator 14 provides the D portion after being amplified in amplifier 15.

The P and D portions are added in an adder 16 and provided with a dead zone by a block 17 having a static characteristic line. The output of block 17 is a desired pressure modification gradient $$\frac{dp}{dt} \text{Sol1}$$

or a similar value (such as a valve delay time).

In addition, the output of adder 16 is supplied to a block 18 with the characteristic curve 18a. The output of the block 18 is "1" within the range of the dead zone (from $-T$ to $T$) and "0" outside of this zone. This value is multiplied in a multiplier 19 with the output of a deceleration control 20 and the result is $$\frac{dp}{dt} \text{Sol12} \cdot \frac{dp}{dt} \text{Sol11} \text{ and } \frac{dp}{dt} \text{Sol12}$$

are added together in an adder 21 and appropriately supplied to a hydraulic control unit 22. The pressure changes are integrated in the hydraulic system 22 and the resulting pressure p is supplied to the brake system of vehicle 24. During small control deviations $\Delta\Phi$, i.e. when the output of adder 21 is between $-T$ and $T$, the use of the characteristic curve in block 17 and 18a sets $$\frac{dp}{dt} \text{Sol11}$$

to zero and only the deceleration control can change the pressures.

Conversely, for greater deviations where $$\frac{dp}{dt} \text{Sol12}$$

is set to zero and, due to its higher priority, the yaw speed alone causes all pressure changes.

The width of the dead zone $-T$ to $T$ can become a function of the vehicle speed, for example.

Besides controlled braking, the yaw speed control can also be used for drive slip; the drive slip can be decreased by reducing the drive moment (engine engagement, braking) if understeering (front wheel drive) or oversteering (rear wheel drive) are too strong.

The terms used in this specification are:
- $\Phi$—yaw speed
- $\delta$—steering angle
- $v_F$—vehicle speed
- $a$—vehicle acceleration
- $\mu_o$—coefficient of friction
- $l$—wheel base
- $R$—curve radius
- $g$—acceleration due to gravity.

Further constants, partially vehicle controlled, are:

$$K_D, K_{vF}, K_o, K_{Ph}, K_b, K_{OG}.$$

There has thus been shown and described a novel process for controlling the stability of vehicles which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

We claim:

1. A process for controlling stability of a vehicle during travel through curves, said process comprising the steps of:
   determining steering angle $\delta$, vehicle yaw speed $\Phi$, vehicle forward speed $v_F$, and coefficient of friction $\mu$ between tires and road;
   calculating a lower limiting value curve of the yaw speed $\Phi$ as a function of the steering angle $\delta$ and in dependence upon the vehicle speed $v_F$ and the coefficient of the friction $\mu$; and
   reducing brake pressure if the yaw speed falls lower limiting value curve.

2. The process defined in claim 1, further comprising the steps of determining an upper yaw speed limit and increasing the brake pressure if the yaw speed exceeds the upper yaw speed limit.

3. The process in accordance with claim 2, further comprising the steps of prescribing a tolerance range for the yaw speed $\Phi$ for small steering angles and decreasing the brake pressure when the yaw speed falls outside this range.

4. The process in accordance with claim 3, further comprising the steps of determining whether the yaw speed $\Phi$ occurs toward steering wheel lock from a given small steering angle onward and decreasing the brake pressure if this requirement is not met.

5. The process in accordance with claim 3, wherein a subsequent steering angle range of the desired value curve is determined by $V_F\delta/L$, where L is a constant representing wheel base.

6. The process in accordance with claim 5, wherein a constant lower limiting value curve is prescribed in a range from a given steering angle $\delta_{max}$ onward.

7. The process in accordance with 6, further comprising the step of prescribing a lower limiting value curve based on segments of a straight line $$\Phi_{Ph} = \pm K_{Ph} \times \left( \Phi_{max}^b + \frac{\delta}{\delta_{max}} (\Phi_{max} \times \Phi_{max}^b) \right);$$

within a range which is between the range determined by $V_F\delta/L$ and the range from $\delta_{max}$ onward; wherein $K_{Ph}$ is a constant, $$\Phi_{max}^b = \frac{1}{1 + K_b(-a)} \Phi_{max},$$

$K_b$ is a constant, $\Phi_{max} = \mu_o(-a)_{max}$, and $K_{\mu o}$ is a constant.

8. The process in accordance with claim 1, further comprising the steps of prescribing a tolerance range for the yaw speed $\Phi$ for small steering angles and decreasing the brake pressure when the yaw speed falls outside this range.

9. The process in accordance with claim 8, further comprising the steps of determining whether the yaw speed $\Phi$ occurs toward steering wheel lock from a given small steering angle onward and decreasing the brake pressure if this requirement is not met.

10. The process in accordance with claim 8, wherein a subsequent steering angle range of the lower limiting value curve is determined by $V_F\delta/L$, where L is a constant representing wheel base.

11. The process in accordance with claim 10, wherein a constant lower limiting value curve is prescribed in a range from a given steering angle $\delta_{max}$ onward.

12. The process in accordance with claim 11, further comprising the step of prescribing a lower limiting value curve based on segments of a straight line $$\Phi_{Ph} = \pm K_{Ph} \times \left( \Phi_{max}^b + \frac{\delta}{\delta_{max}} (\Phi_{max} \times \Phi_{max}^b) \right);$$

within a range which is between the range determined by $V_F\delta/L$ and the range from $\delta_{max}$; wherein $K_{Ph}$ is a constant, $$\Phi_{max}^b = \frac{1}{1 + K_b(-a)} \Phi_{max},$$

$K_b$ is a constant, $\Phi_{max} = \mu_o(-a)_{max}$, and $K_{\mu o}$ is a constant.

13. The process in accordance with claim 1, further comprising step of optimizing the braking slip by means of a brake pressure control.

14. The process in accordance with claim 1, wherein the coefficient of friction $\mu$ is determined from a maximum vehicle deceleration $(-a)_{max}$ during braking.

15. A process for controlling stability of a vehicle during travel through curves, said process comprising the steps of:
   determining steering angle $\delta$, vehicle yaw speed $\Phi$, vehicle forward speed $v_F$ and coefficient of friction $\mu$ between tires and road;
   calculating a desired value curve of the yaw speed $\Phi$ as a function of the steering angle $\delta$ and in dependence upon the vehicle speed $v_F$ and the friction coefficient $\mu$; and adjusting brake pressure to vary the actual yaw speed toward the desired value curve by one of increasing or decreasing the brake pressure.

16. The process in accordance with claim 15, further comprising the steps of prescribing a tolerance range for the yaw speed $\Phi$ for small steering angles and decreasing the brake pressure when the yaw speed falls outside this range.

17. The process in accordance with claim 16, further comprising the steps of determining whether the yaw speed $\Phi$ occurs toward steering wheel lock from a given small steering angle onward and decreasing the brake pressure if this requirement is not met.

18. The process in accordance with claim 16, wherein a subsequent steering angle range of the desired value curve is determined by $V_F\delta/L$, where L is a constant representing wheel base.

19. The process in accordance with claim 18, wherein a constant desired value curve is prescribed in a range from a given steering angle $\delta_{max}$ onward.

20. The process in accordance with claim 19, further comprising the step of prescribing a desired value curve based on segments of a straight line $$\Phi_{Ph} = \pm K_{Ph} \times \left( \Phi_{max}^b + \frac{\delta}{\delta_{max}} (\Phi_{max} \times \Phi_{max}^b) \right);$$

within a range which is between the range determined by $V_F\delta/L$ and the range from $\delta$max; onward $K_{Ph}$ is a constant, $$\Phi_{max}^b = \frac{1}{1 + K_b(-a)} \Phi_{max},$$

$K_b$ is a constant, $\Phi$max $= \mu_o(-a)_{max}$, and $K_{\mu o}$ is a constant.

21. The process in accordance with claim 15, further comprising step of optimizing the braking slip by means of a brake pressure control.

22. The process in accordance with claim 15, wherein the coefficient of friction $\mu$ is determined from a maximum vehicle deceleration $(-a)_{max}$ during braking.

* * * * *